US011369897B2

(12) United States Patent
Bahar et al.

(10) Patent No.: US 11,369,897 B2
(45) Date of Patent: *Jun. 28, 2022

(54) SYSTEM AND METHOD OF WATER PURIFICATION UTILIZING AN IONOMER MEMBRANE

(71) Applicant: Xergy Inc, Harrington, DE (US)

(72) Inventors: Bamdad Bahar, Georgetown, DE (US); Luyu Jin, Harbeson, DE (US); William Parmelee, Seaford, DE (US); Jacob Zerby, Harbeson, DE (US)

(73) Assignee: FFI IONIX IP, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/273,101

(22) Filed: Feb. 11, 2019

(65) Prior Publication Data

US 2019/0256384 A1    Aug. 22, 2019

Related U.S. Application Data

(63) Continuation-in-part of application No. 15/299,110, filed on Oct. 20, 2016, now Pat. No. 10,202,292.

(Continued)

(51) Int. Cl.
*B01D 25/00* (2006.01)
*C02F 9/00* (2006.01)
(Continued)

(52) U.S. Cl.
CPC ............ *B01D 25/00* (2013.01); *C02F 9/00* (2013.01); *B01D 61/00* (2013.01); *C02F 1/14* (2013.01); *C02F 1/26* (2013.01); *C02F 1/447* (2013.01); *C02F 1/4672* (2013.01); *C02F 1/78* (2013.01); *C02F 2201/009* (2013.01)

(58) Field of Classification Search
None
See application file for complete search history.

(56) References Cited

U.S. PATENT DOCUMENTS 3,649,467 A * 3/1972 Winsel et al. ....... B01D 61/364
202/160
4,718,895 A * 1/1988 Kurtz .................. A61M 1/0031
137/205

(Continued)

*Primary Examiner* — Krishnan S Menon
(74) *Attorney, Agent, or Firm* — Invention To Patent Services; Alex Hobson (57) ABSTRACT

A water purification system utilizes an ionomer membrane and mild vacuum to draw water from source water through the membrane. A water source may be salt water or a contaminated water source. The water drawn through the membrane passes across the condenser chamber to a condenser surface where it is condensed into purified water. The condenser surface may be metal or any other suitable surface and may be flat or pleated. In addition, the condenser surface may be maintained at a lower temperature than the water on the water source side of the membrane. The ionomer membrane may be configured in a cartridge, a pleated or flat plate configuration. A latent heat loop may be configured to carry the latent heat of vaporization from the condenser back to the water source side of the ionomer membrane. The source water may be heated by a solar water heater.

19 Claims, 7 Drawing Sheets

Related U.S. Application Data

(60) Provisional application No. 62/244,709, filed on Oct. 21, 2015, provisional application No. 62/385,178, filed on Sep. 8, 2016, provisional application No. 62/385,176, filed on Sep. 8, 2016.

(51) Int. Cl.
| | | |
|---|---|---|
| *C02F 1/14* | (2006.01) | |
| *C02F 1/78* | (2006.01) | |
| *C02F 1/44* | (2006.01) | |
| *B01D 61/00* | (2006.01) | |
| *C02F 1/467* | (2006.01) | |
| *C02F 1/26* | (2006.01) | |

(56) References Cited

U.S. PATENT DOCUMENTS

| | | | | |
|---|---|---|---|---|
| 5,102,550 | A * | 4/1992 | Pizzino | B01D 61/364 |
| | | | | 210/640 |
| 6,030,535 | A * | 2/2000 | Hayashi | B01D 61/58 |
| | | | | 210/652 |
| 6,383,341 | B1 * | 5/2002 | Lysen | B01D 3/007 |
| | | | | 159/901 |
| 6,716,355 | B1 * | 4/2004 | Hanemaaijer | B01D 61/364 |
| | | | | 210/640 |
| 2009/0053576 | A1 * | 2/2009 | Wu | C08F 214/02 |
| | | | | 429/494 |
| 2011/0290725 | A1 * | 12/2011 | Al-Arifi | C02F 1/04 |
| | | | | 210/640 |

* cited by examiner

SYSTEM AND METHOD OF WATER PURIFICATION UTILIZING AN IONOMER MEMBRANE

CROSS REFERENCE TO RELATED APPLICATIONS

This application is a continuation in part of U.S. patent application Ser. No. 15/299,110, filed on Oct. 20, 2016 and now issued as U.S. Pat. No. 10,202,292, which claims the benefit of U.S. provisional patent application No. 62/244,709, filed on Oct. 21, 2015 and entitled System and Method of Water Purification Utilizing an Ionomer Membrane, U.S. provisional patent application No. 62/385,178, filed on Sep. 8, 2016 and entitled Electrochemical Desalination System and U.S. provisional patent application No. 62/385,176, filed on Sep. 8, 2016 and entitled Ozone Generator System; the entirety of all applications listed are hereby incorporated by reference herein.

STATEMENT REGARDING GOVERNMENT LICENSE RIGHTS

This invention was made with government support under contract DE-SC0015923 awarded by Department of Energy. The government has certain rights in the invention.

BACKGROUND OF THE INVENTION

Field of the Invention

The present invention relates to water purification including desalination utilizing an ionomer membrane.

Background

Moisture transport through membranes is a viable method of water purification based on material exclusion and transport selectivity. Ionomer membranes with very small pores and high tortuosity can effectively transport water while rejecting salts, pathogens, silt, and the like, therein providing high purity potable water. Reverse osmosis utilizes high pressure to force water through a filter membrane and is frequently used to produce potable or purified water commercially and in homes. Unfortunately, reverse osmosis requires high pressure for high flux rates through the membrane.

U.S. Pat. No. 8,500,960B, to Ehrenberg et al., discloses a selective mass transfer system that may be utilized for material separation, such for example removing water from sea water. However, the embodiments provided in Ehrenberg et al., and literature to date, have only disclosed the actual membrane separation unit and have not identified important elements that are required to create an efficient and, in some cases, a remote and portable system. For example, sea water normally has components such as particulates that need to be removed prior to the membrane based multi-phase separation system, since particulates can damage the membranes. In addition, water purification systems require energy to perform the selective process and integrating independent power generation into the overall system have not been disclosed or analyzed. Desalination and water purification may be required in remote areas where grid power is not available. System efficiency is also an important consideration.

There exists a need for a water purification system that is energy efficient, can be configured remotely and that both desalinates water and purifies it.

SUMMARY OF THE INVENTION

The invention is directed to a water purification system utilizing an ionomer membrane and mild vacuum to draw the water through the membrane. In an exemplary embodiment, water is drawn through an ionomer membrane, from a water source side of the membrane to the condenser side of the membrane and into a condenser chamber. The water drawn through the membrane passes across the condenser chamber to a condenser surface where it is condensed into purified water. The source water on the water source side of the ionomer membrane may be heated to an elevated temperature to increase the rate of transport through the ionomer membrane. In addition, the condenser surface may be maintained at a lower temperature than the water on the water source side of the membrane. The ionomer membrane may be configured in a cartridge, a pleated or a flat plate configuration. On the water source side of the ionomer membrane, a volume of water is provided, such as salt water, brackish water or a water source the contains impurities, hereinafter collectively referred to as contaminated water or source water. On the outlet side of the membrane is a condenser chamber, having an open volume space for the transport of liquid water vapor that has passed through the membrane. The water vapor in the condenser chamber is condensed on a condenser surface to produce purified liquid water. A mild vacuum is provided to the condenser chamber to draw the water through the ionomer membrane, such as about 0.5 atmospheres. The ionomer membrane selectively transports the water molecules through the membrane while leaving salts and any other impurities within the source water on the water source side or inlet side of the ionomer membrane.

Any suitable ionomer membrane may be used including, perfluorosulfonic acid ionomer membranes, such as NAFION® available from DuPont Inc., or a supported ionomer membrane, or composite membrane, having a support structure and at least one type of ionomer, such as Gore-Select® membranes available from W.L. Gore and Associates. A support structure may be an expanded polytetrafluoroethylene membrane, ePTFE membrane, that is imbibed with an ionomer. A composite or supported membrane may be much thinner than a cast ionomer membrane, as the support structure restrains the ionomer and provides mechanical support. Composite membranes may be as thin as about 25 µm or less, about 20 µm or less, about 15 µm or less, or any range between and including the thicknesses provided and still have sufficient mechanical integrity. The thinner the membrane, the less resistance to flow through the membrane and therefore higher flow rates of water.

The equivalent weight, EW, of the ionomer, the weight of molecular mass per sulfonic acid group, affects the hydration state of the membrane and the water flux rate. While equivalent weights of 1100 or 1200 are common for cast membranes, lower equivalent weights ionomers such as 700, 800, 900, and less than 1000 may have stability issues when not supported. In an exemplary embodiment, the ionomer membrane is a composite membrane having a support structure and a low equivalent weight ionomer, such as less than about 1000, less than about 900 or less than about 800 EW. The ionomer membrane water flux and permeability selectivity is a function of many parameters including, ionomer chemistry, the degree of hydration of the membrane, thickness of membrane, adsorption and desorption kinetics and component activity difference across membrane. Existing ionomer membranes have published water flux rates of 0.6 to 0.9 gal/m²-hr depending on the ionomer chemistry and the design of the system.

In one embodiment, the ionomer membrane is an asymmetric membrane having non-uniform properties from one side, the inlet side, to the opposing side, the outlet side. For example, the inlet side may have exposed ionomer that is hydrophilic and the exit side may comprise an exposed hydrophobic material, such as expanded PTFE membrane and/or a fluoropolymer or fluoropolymer coating containing CF3 groups, which are known to reduce surface energy and render surface hydrophobic as well as oleophobic. The hydrophobic nature on the outlet side may prevent or deter water from re-entering the membrane. In another embodiment, an ionomer membrane may comprise two different ionomer types, a carboxylic acid or sulfonic acid ionomer, for example. One side may comprise a sulfonic acid ionomer and the opposing side may comprise a carboxylic acid ionomer.

Other ionomer membrane compositions that may be useful in the present invention are taught U.S. provisional patent application No. 62/352,321, filed on Jun. 20, 2016, to Bahar, et al., U.S. provisional patent application No. 62/352, 333, filed on Jun. 20, 2016 to Bahar, et al., U.S. provisional patent application No. 62/373,325, filed on Aug. 10, 2016, to Bahar, and U.S. Pat. No. 9,457,324, issued on Oct. 4, 2016, to Xergy Inc., the entirety of all are hererby incorporated by reference herein.

The water purification system may comprise flat ionomer membrane plates, or panels, pleated membrane surface to increase the surface area per volume or a cartridge configuration with the membrane being formed as an inner or outer wall of the cartridge. In an exemplary embodiment, the ionomer membrane is configured is configured with pleats or corrugations to increase the surface are per unit area of the ionomer membrane surface. In an exemplary embodiment, the ionomer membrane is configured into a cartridge, wherein the water source side of the ionomer membrane extends in a cylinder and may be facing out or inward. A ionomer membrane cartridge may further comprise pleats or corrugations to increase the surface area per unit volume.

For a given membrane chemistry, morphology and experimental setup, the water transport through the membrane is a function of the difference in water activity across the membrane. In an exemplary embodiment, the condenser chamber is under vacuum, such as about 0.25 atmospheres or more, about 0.5 atmospheres or more, about 1.0 atmospheres and any range between and including the vacuum pressures provided. The vacuum within the condenser chamber draws the water through the membrane and reduces the activity of water on the condenser side of the membrane. In addition, the water source side, or inlet side, may be heated or be at an elevated temperature with respect to the temperature of the condenser chamber. The water source side may be elevated to a temperature or a temperature differential over the condenser chamber of about 20° C. or more, about 40° C. or more about 50° C. or more, about 40° C. to 80° C. and any temperature range between and including the values provided. A heating loop with a heater in thermal communication with the water in the water source side may be used to heat or maintain a temperature, $T_H$, on the water source side of the water purification system.

The water source side or a portion thereof, may be a color that increase radiant heat absorption, such as black, to heat water retained therein. In an exemplary embodiment, radiant heat from sunlight is used to provide heat to the water source side or to the heating loop. Likewise, the condenser side may be a color to minimize radiant heat absorption, such as white or a reflective color. The water source side may absorb radiant energy from the sunlight while the condenser side reflect or absorbs far less radiant heat, thereby creating a temperature gradient between the two sides.

An exemplary water purification system may comprise a water source heating loop that carries source water from the water source side of the ionomer membrane to a heating device and back to the water source side of the ionomer membrane. A heating device may be a solar heating device, whereby the source water is heated by solar radiation. Conduits of the water source heating loop may be a color to absorb solar radiation, such as black and may be serpentine to increase the exposure time to the solar heating portion of the water source heating loop. The water source heating loop may comprise a solar water heater.

An exemplary water purification system may comprise a latent heat loop that transfer heat from the condenser to the water source side of the ionomer membrane via the source water. A conduit may extend from the water source side of the ionomer membrane to a latent heat chamber inlet and a second conduit may extend from the outlet of the latent heat chamber to the water source side of the ionomer membrane. Source water may circulate through the latent heat loop and conduct the latent heat of vaporization from the latent heat surface of the condenser as it flows over the latent heat surface. The temperature of the source water at the latent heat chamber may be less than the temperature of the source water at the outlet of the latent heat chamber. This use of the latent heat of vaporization increases the efficiency of the system and reduces power requirements.

In an exemplary embodiment, the water on the condenser side of the water purification is pumped to the water source side. The water on the condenser side may be heated by the latent heat of vaporization from the water condensing on the condenser surface and this latent heat of vaporization heats the water on the condenser side. By using the condenser exit water as makeup water for the membrane liquid reservoir the heat of vaporization for some/all of the prevaporated water will be returned to the supply side of the membrane. This is mechanically similar to a counter current heat exchanger, however in this case the heat is transferred by pervaporation and condensation. The energy liberated by condensation is returned to the water source side by having the heated cooling water discharge to the membrane water source reservoir or water source side of the ionomer membrane. In addition, this condensed water flow may be controlled to prevent the membrane liquid reservoir from exceeding salt solubility limits.

In addition, the water purification system may comprise one or more water dumps that may be used to expel source water from the system as it may reach a threshold salinity level. A source water dump valve may be configured at any suitable location but preferably where it will not carry too much heat away from the system. An exemplary location of a source water dump valve and outlet is in a latent heat loop just prior to the latent heat chamber. In addition, some water may be dumped to waste or out of the system to control salinity levels or water temperature on the water source side, such as to prevent the water source side from becoming too hot, for example.

Make-up water may be pumped into the system as required, such as directly into the water source side or into the condenser side, such as into the latent heat chamber or into a conduit of a heating loop, and may then be circulated or pumped to the water source side The condenser surface may be metal or any other suitable surface and may be flat or pleated. The condenser may separate the condenser chamber from the latent heat chamber and may be substantially gas impermeable.

The partial pressure of water at the membrane outlet side of the condenser chamber is higher than the pressure on the condenser surface. The condenser surface may be metal that is at a lower temperature than the water source side. As the water condenses on the condenser surface, the latent heat of vaporization is released and may be transported through the condenser material to the condenser side of the water purification system. This drop in pressure, dP, across the condenser chamber will cause the water vapor to flow from membrane surface to the condenser surface and heat to flow through condenser into the water on the condenser side. The purified condensed water will be drawn out of the condenser chamber and can be used for drinking and the like.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
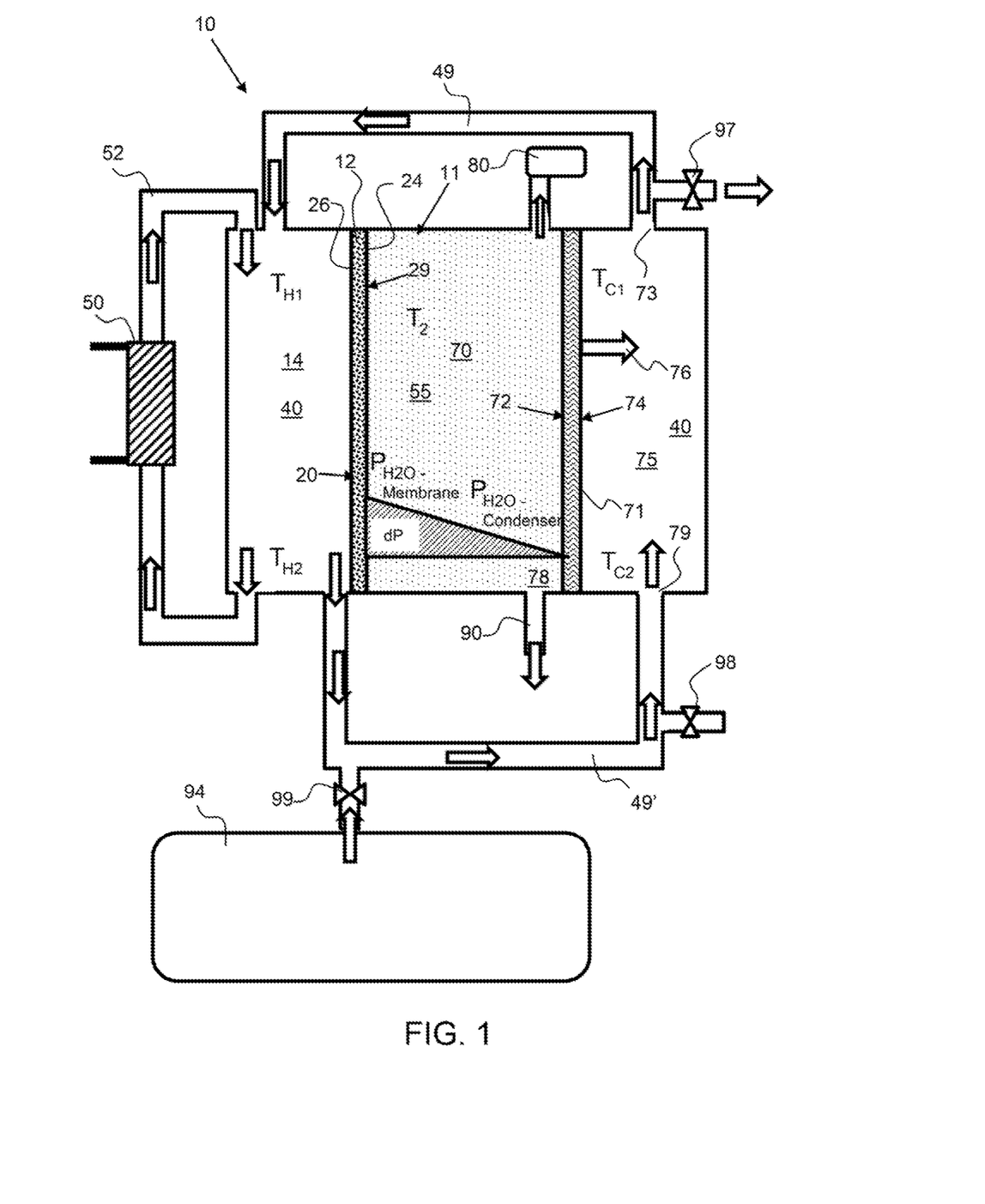
FIG. 1 shows a diagram of an exemplary water purification system having a water sources side separated from a condenser chamber by an ionomer membrane and a condenser surface for condensing the water that passes through the ionomer membrane.

As shown in FIG. 1 an exemplary water purification system 10 has a ionomer membrane 12 that separates a water source chamber 14 containing source water 40 from a condenser chamber 70. The membrane separator 11 allows water 55 from the source water to pass from the water source side 20 of the ionomer membrane 12 to the condenser side 29 of the ionomer membrane and into the condenser chamber 70. This water 55, in vapor phase is then condensed on the condenser surface 72 surface of the condenser 71. Condensed water 78 then flows out of the condenser water outlet 90. When the water source is salt water, clean desalinated water will be produced in the condenser chamber and will be suitable for drinking and consumption. A vacuum device 80 is coupled with the condenser chamber 70 and produces a vacuum pressure in the condenser chamber to increase the flow of water through the ionomer membrane. Vacuum is drawn on the condenser chamber and the partial pressure of the water vapor $P_{H2O}$ in the condenser chamber drops from the condenser side of the membrane 29 to the condenser surface 72, as shown. Purified clean water is drawn out of the condenser chamber for use. A plurality of heating loops are used to heat the source water and one or more valves may control the flow of water from the condenser side and/or the water reservoir to the water source side. Water from the water source side and/or the condenser side may be pumped or released from the system as required by the system requirements As shown in FIG. 1, the source water 40 is heated by a water source heating loop 52 that carries water from the water source chamber 14 to a heating device 50 and back to the water source chamber. The temperature of the source water at the water source heating loop inlet TH2 may be lower than the temperature of the source water at the water source heating loop outlet TH1, as the source water is heated by the heating device 50. A heating device 50 may be solar heater or a solar hot water heater, for example. It may also draw heat from a power source, such as from a fuel cell or from the pumps, wherein heat from these devices may be conducted by a flow of source water. Conduits may extend around a power source, i.e. fuel cell, or around a vacuum or water pump.

As shown in FIG. 1, the source water 40 is heated by a latent heat loop that conducts heat from the condenser. A latent heat chamber 75 extends along the latent heat surface 74 of the condenser 71. A flow of source water 40 passes over the latent heat surface and back to the water source chamber 14. A latent heat loop conduit 49 extends from the latent heat chamber outlet 73 back to the water source chamber 14 and a latent heat loop conduit 49' extends from the water source chamber 14 to the latent heat chamber inlet, thereby producing a heating loop.

As shown in FIG. 1, a water reservoir 94 is utilized to provide make-up water as the source water is depleted through the water purification system and/or is dumped to control heat and/or salinity. A make-up water valve 99 may be used to control the flow of source water into the system. The system may comprise one or more dump valves, such as a source water dump valve 98 and a heat dump valve 97, both of which exhaust source water from within the system.

Figure 2:
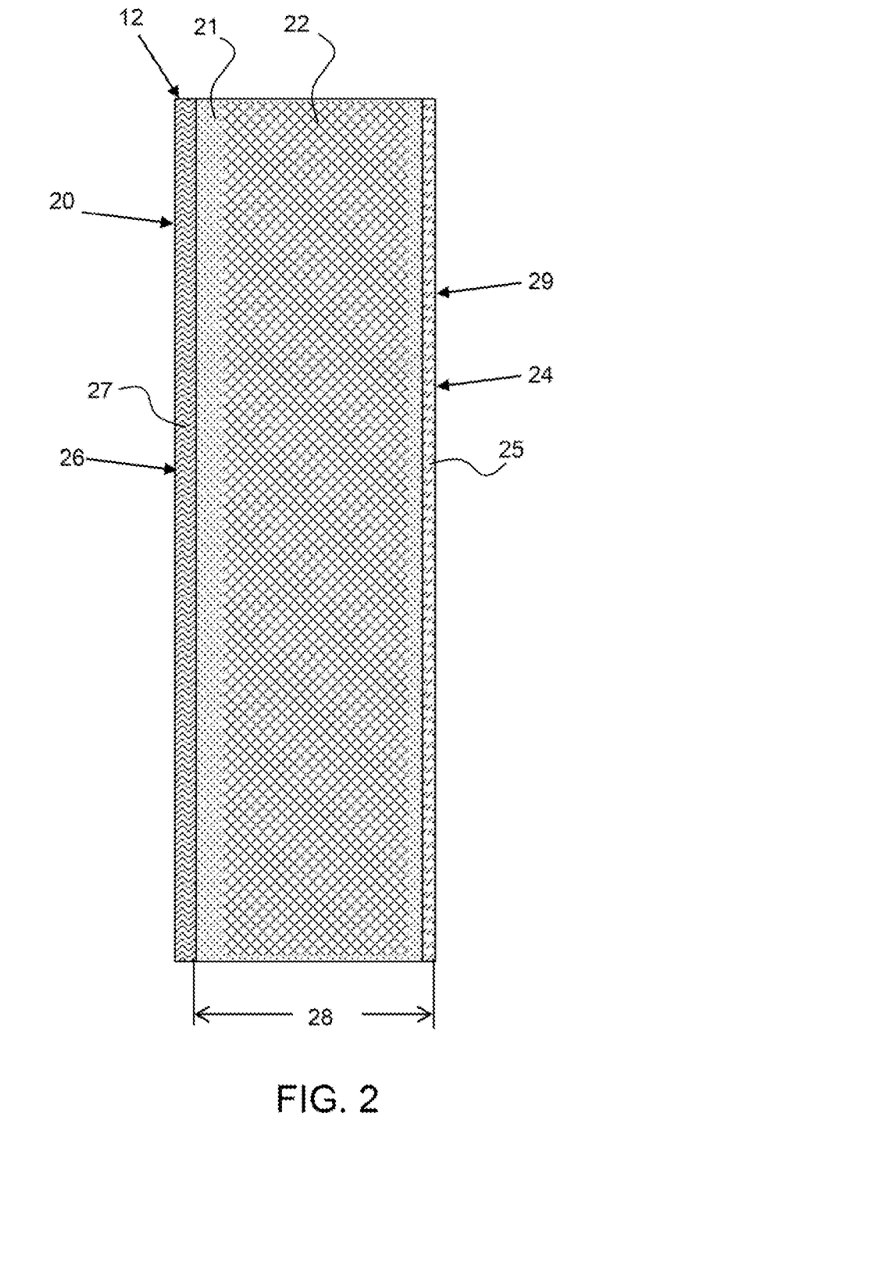
FIG. 2 shows a cross-section view of an exemplary ionomer membrane.

As shown in FIG. 2, an exemplary ionomer membrane 12 is a supported or composite membrane having a support 22, such as an expanded PTFE membrane and an ionomer 21 extending within the porosity of the support layer. The ionomer substantially fills the voids or pores of the expanded PTFE membrane and there are thin layers of ionomer on either side of the support, referred to as butter-coat layers. The water source side 20 of the ionomer membrane may be a hydrophilic surface 27 and comprise a hydrophilic material 27 thereon. The condenser side 29 of the ionomer membrane may comprise a hydrophobic surface 24 and comprise a hydrophobic material 25, such as ePTFE membrane or a fluoropolymer coating. The thickness 28 of the ionomer membrane may be less than 25 µm as described herein, and may be less than 15 µm.

Figure 3:
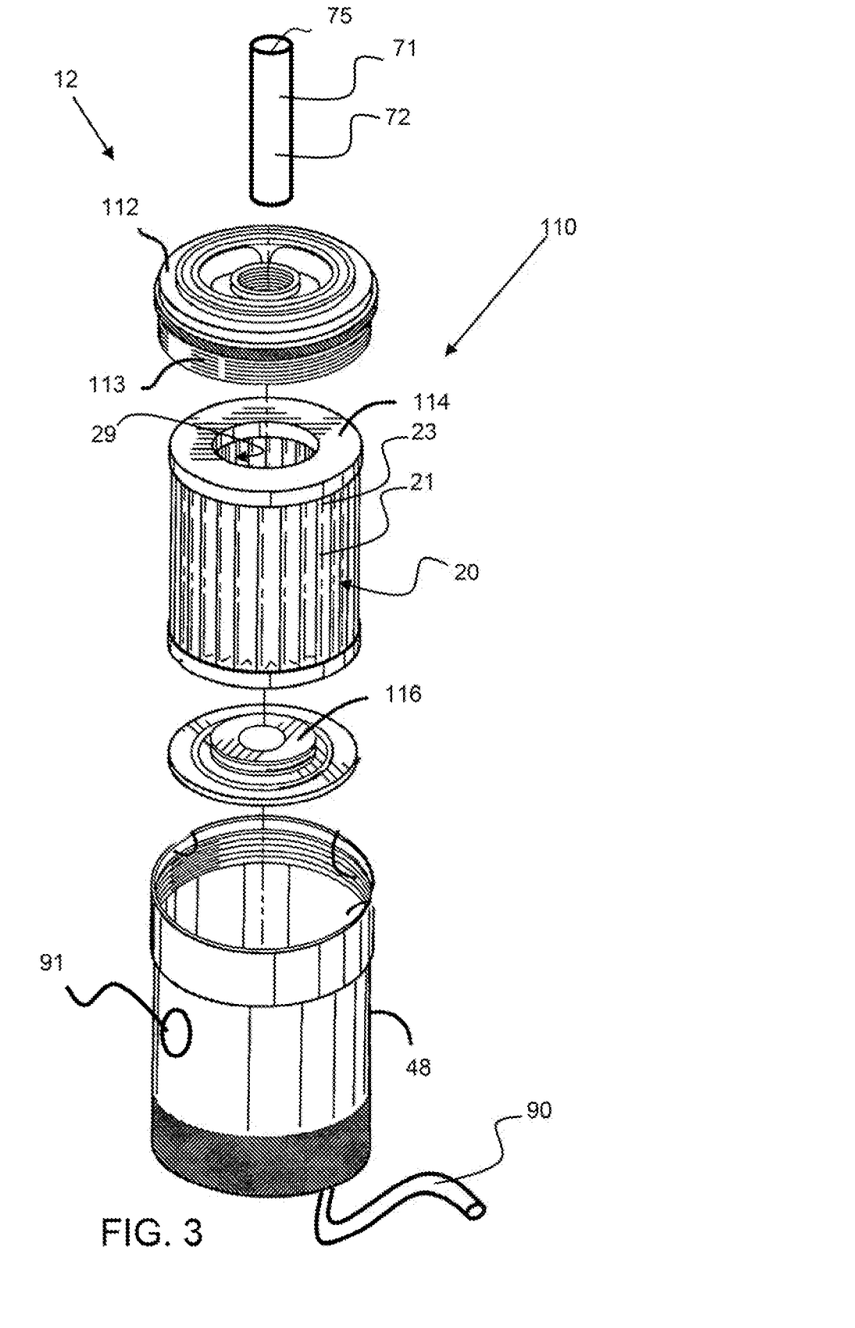
FIG. 3 shows an isometric view of an exemplary water purification cartridge having a pleated ionomer membrane portion.

FIG. 3 shows an exemplary water purification cartridge 110 having a pleated ionomer membrane 23 configured around a condenser 71. The condenser in this embodiment is a tube that extends down through the cartridge creating a condenser chamber between the outside surface of the condenser surface 72 of the tube and the condenser side 29 of the pleated ionomer membrane. Water may flow through the condenser tube to provide a cool influx of water for keeping the temperature of the condenser low for condensation. A latent heat chamber 75 may be configured within the condenser tube. The cartridge comprises a cartridge cap 112 and a cartridge bottom cap 116. A seal 113 may be configured between the caps and the components of the cartridge to produce chambers. A water inlet 91 and condensed water outlet 90 are shown. The water source enclosure 48 enable the source water to be contained next to the ionomer membrane within the cartridge.

Figure 4:
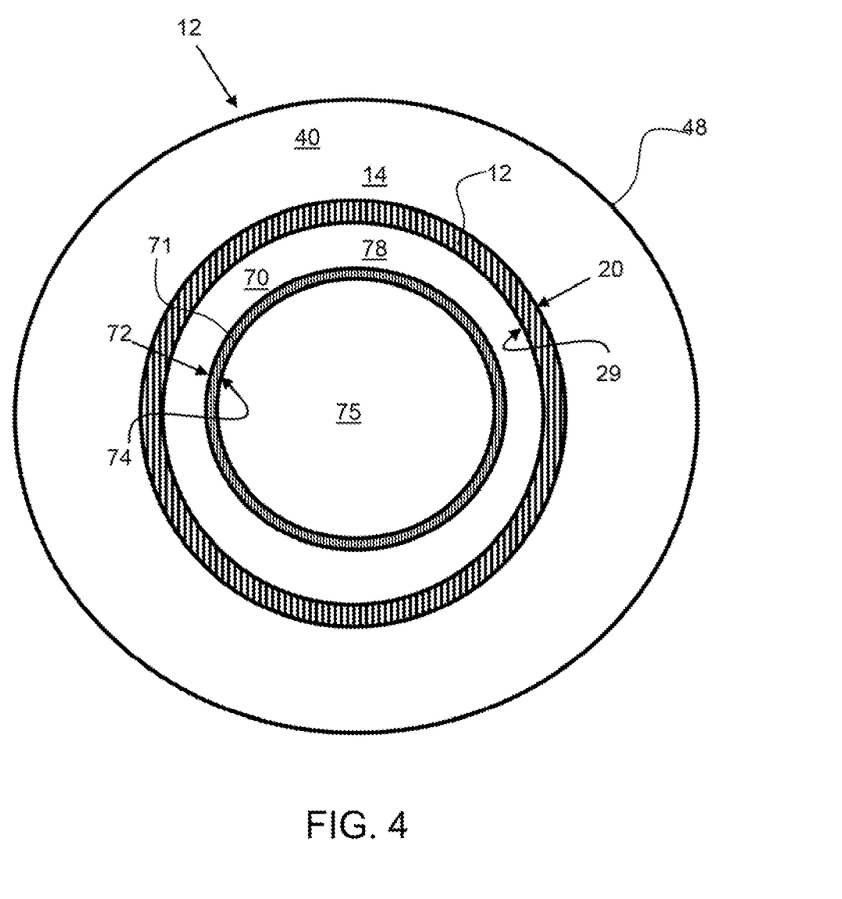
FIG. 4 show a top down view of an exemplary water purification system in a concentric configuration.

FIG. 4 shows an exemplary water purification system 12 in a concentric configuration. The ionomer membrane 12 is configured around the condenser chamber 70 and may be in a pleated configuration to increase the surface area per volume. The condenser 71 is concentrically configured inside of the ionomer membrane. A separate enclosure 48 is configured around the membrane and produces a water source chamber 14 for retaining source water 40. A latent heat chamber 75 is configure in the center and inside of the latent heat surface 74 of the condenser 71. The condenser chamber 70 is configured between the membrane 12 and the condenser 71 and condensed water 78 is produce as the water 55 condensed on the condenser surface 72 of the condenser 71. This exemplary system may contain a certain volume of water or it may pump water through the system wherein the condenser side is a conduit, for example.

Figure 5:
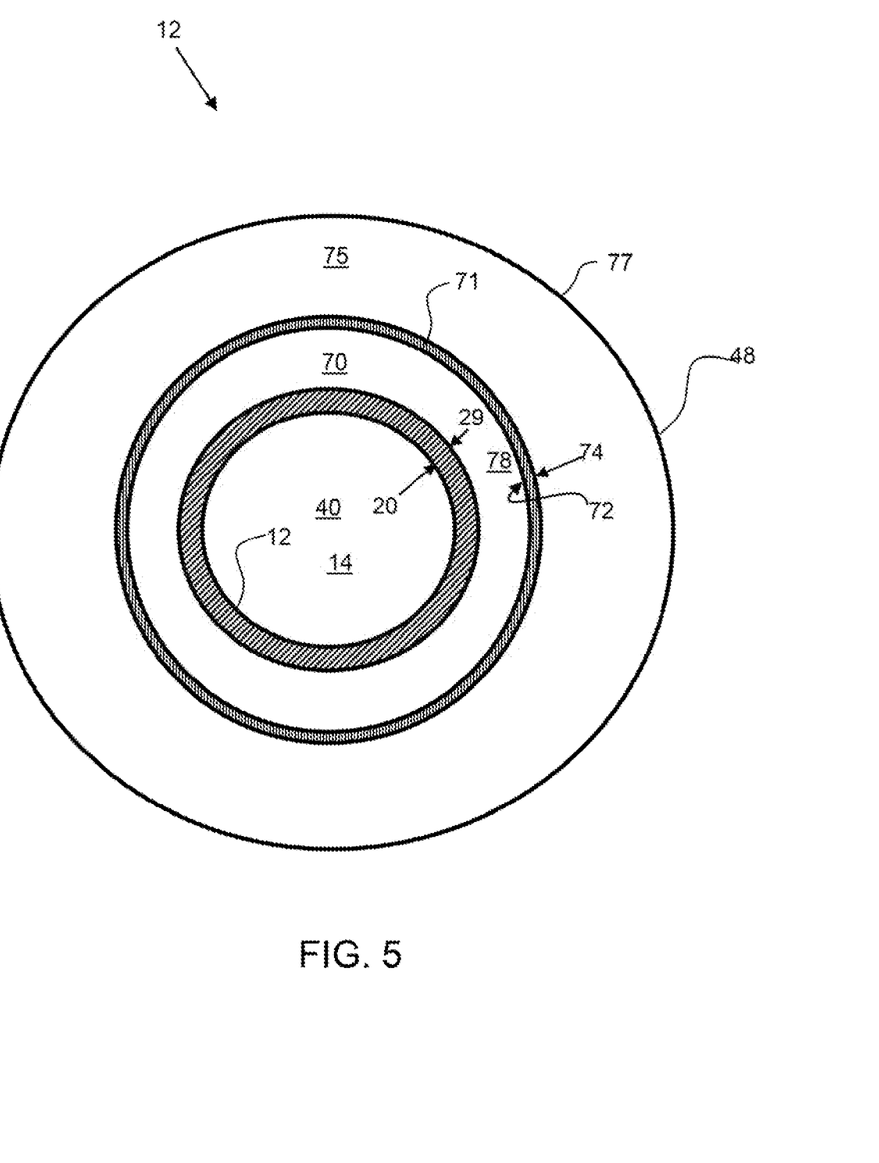
FIG. 5 show a top down view of an exemplary water purification system in a concentric configuration.

FIG. 5 show an exemplary water purification system 12 in a concentric configuration. In this alternative configuration the membrane 12 is configured within the interior of the system around the water source chamber 14 that contains source water 40. Water passes through the membrane to the condenser chamber 70 and is condensed on the condenser surface 72 of the condenser 71. A latent heat chamber 70 is configured on the outer portion of the cartridge between the enclosure 48 and the condenser 71. Again, water may be pumped through the system or this may be a closed cartridge, at least on one side.

Figure 6:
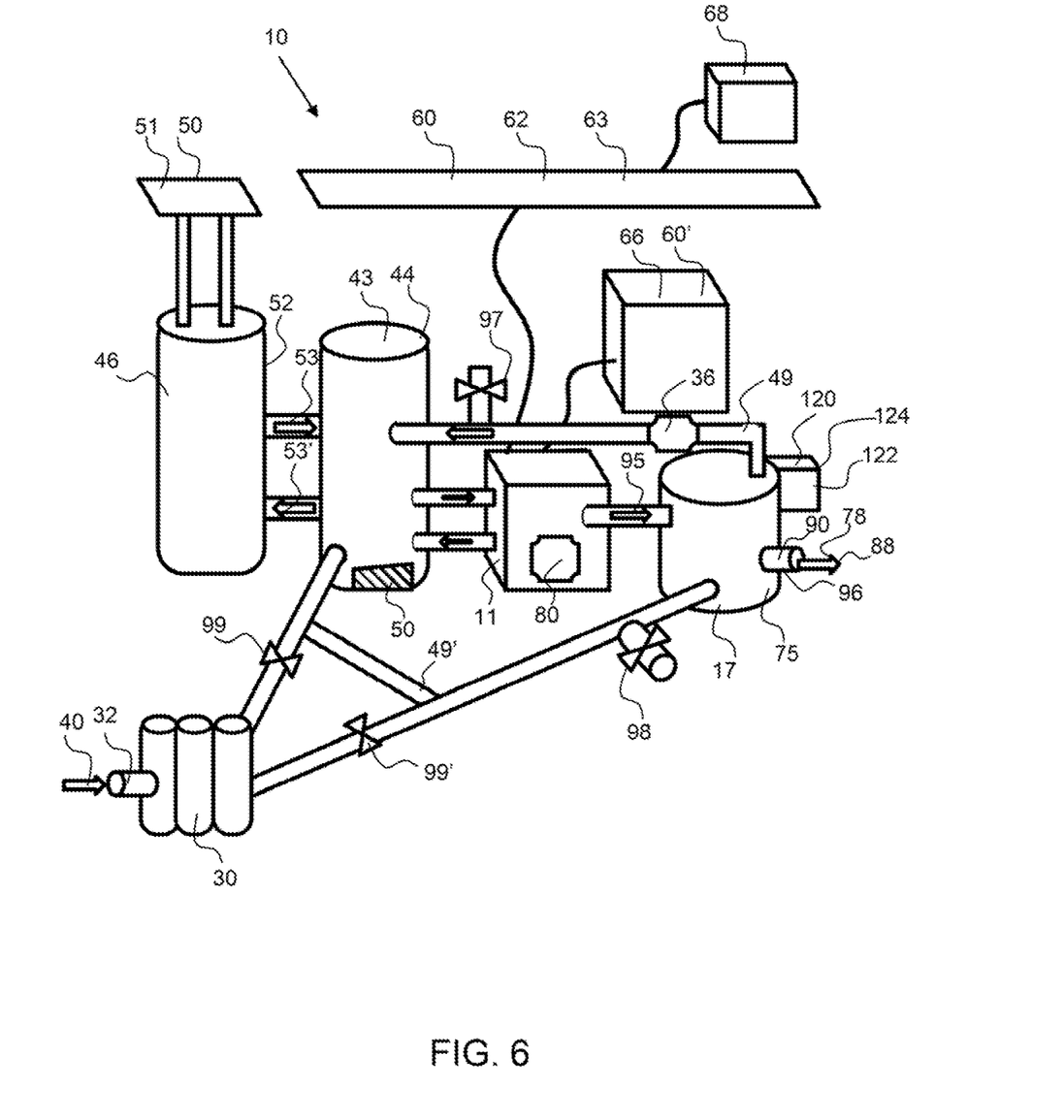
FIG. 6 show a perspective view of an exemplary remote water purification system having a solar water heater and solar panels as well as a fuel cell for power requirements.

As shown in FIG. 6, an exemplary water purification system 10 comprises a membrane separator 11, a condenser portion 17 and a heating device 50. An inlet 32 for source water 40, such as salt water or water with impurities, receives the source water and directs the source water through a filtration system 30. The filtration system may have one or more filter elements or modules to reduce physical components from the water and absorb components from the water, such as an activated carbon filter. The source water may then be fed to the source water reservoir 43, such as a hot water tank 44 having a heating device 50, or to the latent chamber 75, configured in the condenser portion 17. The source water may travel in the latent heat loop which includes a latent heat loop conduit 49' that couples source water from the water source side of the ionomer membrane to the latent heat chamber, and the latent heat loop conduit 49 that extends from the latent heat chamber back to the source water reservoir 43. The source water may also be heated by a water source heat loop 52 that pulls source water from the water source side of the ionomer membrane, such as from the water source chamber or source water reservoir and heats it and then returns it, such as to the water source chamber, indirectly or indirectly. The water source heat loop has two conduits 53, 53' for pulling water to be heated and for returning the source water, respectively. The heating device of the water source heat loop is a solar heater 51 configured with a solar hot water heater 46. The water purification system also comprises a number of valves, 99, 98, 97, for controlling the flow of water through the system and into and/or out of the system. Valves 99, 99' control the flow of inlet source water to the system. Valves 98 and 97 may be used to dump source water from the system for the purpose of controlling heat or salinity of the source water. A pump 36 may control the flow of source water through the system. A vacuum device 80, such as a vacuum pump may create a vacuum within the condenser chamber to draw water through the ionomer membrane and into the condenser chamber where it is condensed to produce condensed water 78. The condensed water may be further purified using a purifying device 120, such as an ozone generator 122 or UV light source 124 for example. An ozone generator may be an electrochemical ozone generator, as described in U.S. provisional patent application No. 62,385,176, entitled Ozone Generator System which is hereby incorporated by reference herein. A condensed water outlet 90 or purified water outlet 96 provide a flow of condensed water 78 or purified water 88, respectively, depending on if the purifier device is utilized.

As shown in FIG. 6, electrical power is provided by portable power supplies 60, 60' including a solar power source 62 which includes photovoltaic cells 63 and a fuel cell power device 66. The solar panels may provide power during daytime hours and the fuel cell may provide power at night or during periods of low solar radiation. In an alternative embodiment, a rechargeable battery 68 is used and is charged by the solar panels and then provides power during low light conditions. A rechargeable metal ion battery, such as available from Fluidic Energy, Phoenix, Ariz., may be employed for this purpose.

The filtration system 30, may be a multistage filtration system having e many different combinations. An exemplary and common combination is 5-micron polypropylene sediment melt blown filter, CTO carbon block cartridge, and GAC coconut Shell Carbon Filter. Sediment filter removes sand and big particles, Carbon& GAC filter remove odors, taste& chemicals, including chlorine, herbicides, and pesticides. Since these filters provide purifier water to the rest of system, it reduced chance of fouling, which could increase the lifetime of the whole system. A water purification system may employ a filtration system and a purifier device.

Figure 7:
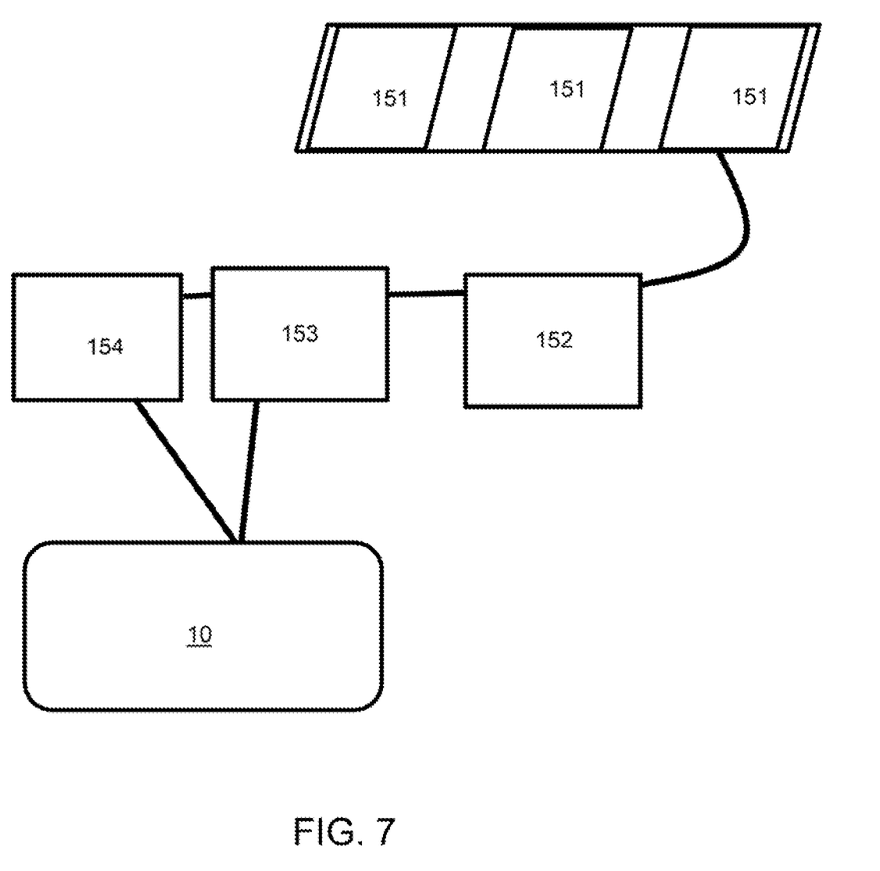
FIG. 7 shows a diagram of an exemplary solar powered system.

Referring to FIG. 7, a solar power system could be used to provide electrical power to run the desalination system. A photovoltaic solar panel produce electrical power from solar radiation. Multiple solar panels 151 could be connected in series or in parallel. They are controlled by the solar charge controller 152. A power invertor 153 may be required to convert DC to AC current. Finally, electrical energy produced by the solar panels, or a portion thereof, may be stored in a battery bank 154.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A water purification system comprising:
   a) a membrane separator comprising:
      i) an ionomer membrane that is permeability selective and has a water source side and a condenser side;
      ii) a condenser comprising:
         latent heat surface; and
         a condenser surface;
      iii) condenser chamber formed between the ionomer membrane and the condenser;
      iv) a water source chamber configured on said water source side of the ionomer membrane;
      wherein source water at a first temperature is configured on the water source side of the ionomer membrane in said water source chamber;
      wherein the condenser chamber is maintained at a second temperature that is below the first temperature; and
      wherein water is drawn through the ionomer membrane from the source water chamber to the condenser chamber where it condenses on the condenser to form purified water;
   b) a latent heat loop comprising:
      a latent heat chamber comprising:
         a latent heat inlet; and
         a latent heat outlet;
      wherein said latent heat chamber extends along the latent heat surface of the condenser and is configured on an opposite side the condenser from the condenser chamber;
      a flow of said source water into said latent heat loop over the latent heat surface of the condenser in said latent heat chamber;
      wherein said flow of source water increases in temperature from said latent heat inlet to said latent heat outlet before returning to the water source chamber;
   c) a purified water outlet from the condenser chamber;
   d) a vacuum device that is coupled with the condenser chamber and configured to create a vacuum pressure within the condenser chamber to draw water through the ionomer membrane;
   e) a water source heating loop that carries source water from the water source chamber to a heating device and back to the water source chamber.

2. The water purification system of claim 1, wherein the membrane separator forms a separator tube having an interior side and an exterior side.

3. The water purification system of claim 2, wherein the water source side is the exterior side of the separator tube and the condenser is within the separator tube; and wherein the condenser chamber is configured between the separator tube and the condenser.

4. The water purification system of claim 3, wherein the membrane separator is a pleated membrane separator.

5. The water purification system of claim 3, wherein the membrane separator comprises a support layer.

6. The water purification system of claim 3, wherein water flows from the water source side of the water source chamber to the latent heat chamber.

7. The water purification system of claim 2, wherein the water source side is the interior side of the separator tube and the condenser is configured around the exterior side of the separator tube and wherein the condenser chamber is configured between the separator tube and the condenser.

8. The water purification system of claim 7, wherein the membrane separator is a pleated membrane separator.

9. The water purification system of claim 1, further comprising an ozone generator that produces ozone to disinfect the purified water.

10. The water purification system of claim 9, wherein the ozone generator is an electrochemical ozone generator.

11. The water purification system of claim 1, wherein the ionomer membrane comprises a perfluorosulfonic acid ionomer.

12. The water purification system of claim 1, wherein the ionomer membrane is a composite ionomer membrane having a support configured with an ionomer and wherein the ionomer comprises a perfluorosulfonic acid ionomer having an equivalent weight of no more than 1000.

13. The water purification system of claim 1, wherein the ionomer membrane has a hydrophobic condenser side and a hydrophilic water source side.

14. The water purification system of claim 1, further comprising a solar heater to heat the source water.

15. The water purification system of claim 1, wherein the water source heating loop comprises a solar heater.

16. The water purification system of claim 1, wherein source water flows from the latent heat chamber outlet back to the water source side of the ionomer membrane.

17. The water purification system of claim 1, wherein the ionomer membrane is an asymmetric membrane comprising a first side consisting essentially of a sulfonic acid ionomer and a second and opposing side consisting essentially of a carboxylic acid ionomer.

18. A water purification system comprising:
   a) a membrane separator comprising:
      i) an ionomer membrane having a water source side and a condenser side;
   b) a condenser comprising:
      i) a condenser surface;
      ii) a latent heat surface that is opposite the condenser surface;
   c) a condenser chamber formed between the ionomer membrane and the condenser surface of the condenser d) a latent heat chamber;
  wherein the latent heat surface faces the latent heat chamber;
  wherein source water at a first temperature is configured on the water source side of the ionomer membrane;
  wherein the condenser chamber is maintained at a second temperature that is below the first temperature; and
  wherein water is drawn through the ionomer membrane from the source water to the condenser chamber where it condenses on the condenser to form purified water;
e) a purified water outlet from the condenser chamber;
  wherein the membrane separator forms a separator tube having an interior side and an exterior side;
  wherein water flows from the latent heat chamber to the water source side of the membrane separator;
f) a vacuum device that is coupled with the condenser chamber and configured to create a vacuum pressure within the condenser chamber to draw water through the ionomer membrane;
g) a water source heating loop that carries source water from the water source chamber to a heating device and back to the water source chamber.

19. The water purification system of claim 1, wherein separator tube is a pleated membrane separator.

* * * * *